(12) United States Patent
Sham et al.

(10) Patent No.: US 6,334,060 B1
(45) Date of Patent: Dec. 25, 2001

(54) MULTI-CHANNEL OR SPLIT-FREQUENCY, LOW FREQUENCY, TELEMETRY CIRCUIT AND METHOD BETWEEN TRANSMITTERS AND RECEIVERS

(75) Inventors: Ka Yiu Sham, Great Falls, VA (US); Philip Lim-Kong Wong, Northants (GB)

(73) Assignee: Acumen, Inc., Sterling, VA (US)

( * ) Notice: Subject to any disclaimer, the term of this patent is extended or adjusted under 35 U.S.C. 154(b) by 0 days.

(21) Appl. No.: 09/179,881

(22) Filed: Oct. 28, 1998

Related U.S. Application Data
(60) Provisional application No. 60/063,354, filed on Oct. 28, 1997.

(51) Int. Cl.$^7$ .............................. H04B 1/10; H04B 1/06; H04B 1/16; H04M 11/00; H03L 7/08
(52) U.S. Cl. .................... 455/500; 455/212; 455/218; 455/266; 455/260; 455/258; 455/334; 455/339; 455/326; 379/106.01; 331/DIG. 2; 331/4
(58) Field of Search ........................... 455/500, 212, 455/575, 73, 91, 213, 218, 222, 266, 326, 334, 339, 260, 255–258, 263, 265; 379/106.01; 375/145; 340/870.11; 331/4, 9, 16, 31, 32, 34, 42, DIG. 2; 381/4

(56) References Cited

U.S. PATENT DOCUMENTS

| | | | |
|---|---|---|---|
| 4,503,401 | * | 3/1985 | Kriyakos et al. ..................... 331/4 |
| 4,847,617 | * | 7/1989 | Silvian ........................... 340/870.16 |
| 5,367,555 | * | 11/1994 | Isoyama ........................ 379/106.01 |
| 5,488,631 | * | 1/1996 | Gold et al. .......................... 375/145 |
| 5,748,104 | * | 5/1998 | Argyroudis et al. ........... 340/870.11 |
| 5,774,555 | * | 6/1998 | Lee et al. ............................... 381/4 |
| 6,047,170 | * | 4/2000 | Paulsen et al. ..................... 455/212 |

* cited by examiner

Primary Examiner—Tracy Legree
(74) Attorney, Agent, or Firm—Crowell & Moring LLP

(57) ABSTRACT

A multi-channel system is provided for both wide-band and narrow band low frequency transmission/reception of digital telemetry. The multi-channel system uses coherent detection having a high selectivity, and a quadrature detector having a high sensitivity. A filter is provided to average out noise. The multi-channel system oscillator is software controlled for scanning/multiplexing. The multi-channel system is used for data transmission over inductive, infrared, sonic and cable links.

3 Claims, 7 Drawing Sheets

LOWPASS TABLE

| CODE1 | CODE2 | CUT-OFF FREQUENCY |
|---|---|---|
| 0 | 0 | 10 HZ |
| 0 | 1 | 30 HZ |
| 1 | 0 | 100 HZ |
| 1 | 1 | 150 HZ |

BANDPASS TABLE

| CHL1 | CHL2 | CENTER FREQUENCY | Q |
|---|---|---|---|
| 0 | 0 | 4680 HZ | 40 |
| 0 | 1 | 5460 HZ | 40 |
| 1 | 0 | 6554 HZ | 40 |
| 1 | 1 | 7282 HZ | 40 |

POWER CONTROL TABLE

| $\overline{EN}$ | Tx/$\overline{Rx}$ | Vcc1 | Vcc2 |
|---|---|---|---|
| 0 | 0 | ON | ON |
| 0 | 1 | ON | OFF |
| 1 | 0 | OFF | ON |
| 1 | 1 | OFF | OFF |

MULTI-CHANNEL OR SPLIT-FREQUENCY, LOW FREQUENCY, TELEMETRY CIRCUIT AND METHOD BETWEEN TRANSMITTERS AND RECEIVERS

This application claims the benefit of prior filed provisional application serial No. 60/063,354, filed Oct. 28, 1997 and entitled "Split-Frequency (LF) Telemetry Circuit and Method Between Transmitters and Receivers".

The invention relates to a circuit and method for overcoming the disadvantages of interchannel-interference and cross-talk which can occur between transmitters and receivers.

The invention provides wireless anti-jamming and selective address low frequency telemetry for data transmission offering a high degree of immunization against interchannel-interference and cross-talk. The invention makes use of wireless low frequency (split-frequency for channel separation) telemetry in order to convey information between a transmitter and a receiver. In particular, the invention has applications with respect to heart rate chest belt transmitters which communicate with receivers which can be either of a wrist-watch type, a belt-clip type, or as part of a fitness monitor mounted on a particular piece of fitness equipment. Of course, it will be understood that the invention could also be used with respect to any communication application which may suffer from interchannel-interference and cross-talk between transmitters and receivers.

It is known in health club settings, where the fitness or exercise machines, such as treadmills, are placed close to one another, or when a number of individuals exercising using the heart rate transmitter are within each others wireless receiving vicinity, that a certain amount of interchannel-interference and cross-talk may occur which jeopardizes the accuracy between the transmitter and the receiver. These problems are overcome according to the present invention.

According to the present invention, a wide-band, low frequency transmitter and receiver system termed a "multi-channel system" is provided for digital telemetry and features high selectivity, high sensitivity, safeguards against in-channel noise and the capability of scanning/multiplexing multiple stations. The multi-channel system is available not only for wide-band applications, but also for narrow-band applications such as with respect to the known heart rate monitors discussed above.

At radio frequencies wherein the transmission bandwidth is not very critically limited, i.e., on the order of hundreds-of MHz to the GHz range, the use of frequency division multiplexing (FDM) has been used with respect to coaxial cable links, radio links, and satellite links. However, at low frequencies, the transmission bandwidth limitation becomes a major concern. For example, a power line cable has a transmission band with typically only around 1 MHz. As such, frequency division multiplexing and filtering become increasingly difficult. The present invention is designed specifically for such low frequency telemetry systems wherein the available bandwidth is at a premium.

According to the present invention, the multi-channel system makes use of coherent detection (having a high selectivity-typical channel separation of approximately a few hundred Hz), quadrature detection (also having a high sensitivity), a matching filter to average out noise, and a system clock which is software steerable for scanning/multiplexing. Advantageously, the multi-channel system is useful for data transmission over inductive, infrared, sonic and cable links. By providing enhanced electrical noise immunity, the multi-channel system is suitable for industrial applications wherein noise sources are present.

Example of Split-frecuency Telemetry Approach

One approach against interchannel-interference is by using the method of providing a separate frequency for each channel.

1. Channel allocation

Considering the available bandwidth and possibly the level of cross-talk, nine (9) discrete frequencies are designated with the following channel numbers for communication.

| Channel number | 0 | 1 | 2 | 3 | 4 | 5 | 6 | 7 | 8 |
|---|---|---|---|---|---|---|---|---|---|
| Frequency (Khz) | 2.8 | 3.0 | 3.2 | 3.4 | 3.6 | 3.8 | 4.0 | 4.2 | 4.4 |

Channel 0 (2.8 Khz) is reserved for a so-called "Proximity down-loading" identification ID exchange protocol use.

2. Proximity down-loading

During a channel number initialization routine, the transmitter decides upon a channel for subsequent cardiac data transmission through a random number generator. This "official channel number" is passed on to the receiver by "near field" Proximity down-loading, that is, by bringing the receiver close to the transmitter. The transmitted code has the following format.

| <START> | <CHANNEL #> | <CHANNEL #> | <STOP> |
|---|---|---|---|
| 1 bit | 3 bits | 3 bits | 1 bit |

The receiver, after checking the twice received channel number, will "beep" to acknowledge a successful ID transfer. Thereafter, that channel/frequency will be the communication channel between the agreed transmitter/receiver pair.

Should interchannel-interference be encountered, the ID transfer routine can be activated by Proximity down-loading for a new ID (channel #).

3. Coherent detection

Split-frequency uses one out of the nine possible communicating frequencies: 2.8 Khz, 3.0 Khz, 3.2 Khz, 3.4 Khz, 3.6 Khz, 3.8 Khz, 4.0 Khz, 4.2 Khz and 4.4 Khz to separate among different channels for different users.

The transmitter and the receiver have to acknowledge an agreed channel (frequency) for their cardiac data transmission by the "Proximity down-loading" mechanism during the ID initialization routine.

Such a narrow band system calls for coherent detection that requires a replica of the transmitter carrier (reference signal) to be re-generated at the receiver.

The above requirement can be realized by a microprocessor programmable oscillator at the transmitter (master oscillator) generating one out of the nine possible carrier frequencies for amplitude shift keying modulation during data transmission.

The corresponding receiver, acknowledged with the channel # for communication through the ID initialization routine at 2.8 Khz (default) has its on-board microprocessor programmable oscillator (slave oscillator) steered to the same (reference) frequency for coherent detection.

General illustrations of the split-frecuency, multi-channel, transmitter and receiver systems, as well as a prototypical circuit implementation, are described below in the drawings.

Other objects, advantages and novel features of the present invention will become apparent from the following detailed description of the invention when considered in conjunction with the accompanying drawings.

DETAILED DESCRIPTION OF THE DRAWINGS

Figure 1:
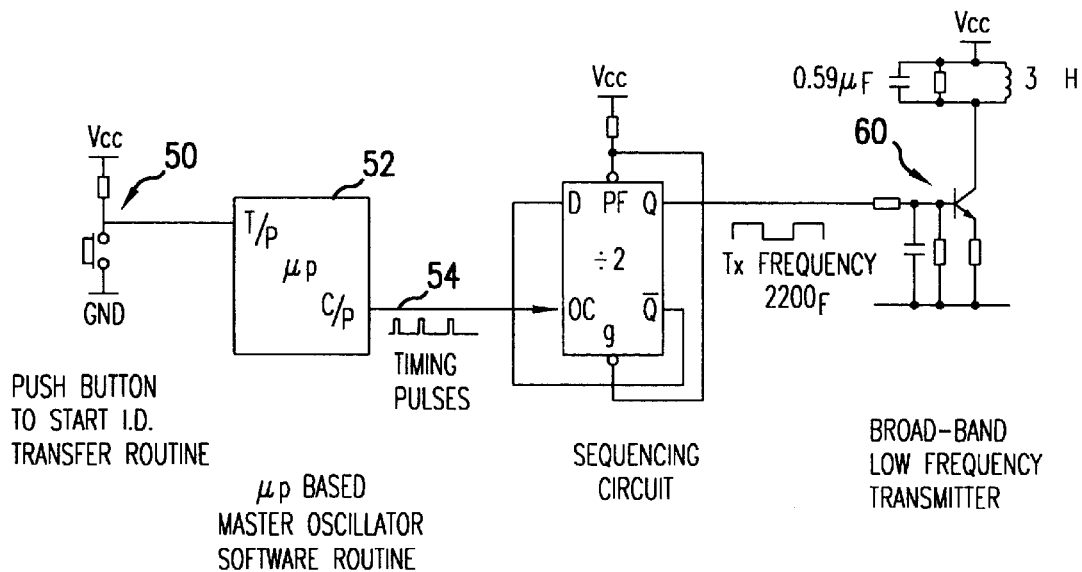
FIG. 1 is a general schematic circuit diagram of a split-frequency transmitter according to the present invention.

Referring to FIG. 1, there is shown the split-frequency transmitter circuit which includes a push button switch 50 which is activated in order to begin the identification initialization transfer routine (and to select among multi-channels). The activation of the push button switch provides an input to the microprocessor 52 which is a master oscillator operating a software routine. The microprocessor 52 outputs timing pulses 54 which are fed to a squaring circuit formed with a D-type flip flop 56. The timing pulses provide the clock input to the D flip flop. The inverted Q output from the D flip flop is fed to the D input. The Q output from the D flip flop provides an input to a broad-band low frequency transmitter circuit 60 shown in FIG. 1 composed of a capacitor, two resistors, and a transistor.

The following table indicates the timing pulses provided from the microprocessor to obtain the desired transmission frequencies in accordance with the assigned channel number.

| Assigned Channel | μp timing pulses (us) | μp output frequency (Khz) | Squaring circuit Tx (Khz) |
|---|---|---|---|
| 0 | 179 | 5.6 | 2.8 |
| 1 | 167 | 6.0 | 3.0 |
| 2 | 156 | 6.4 | 3.2 |
| 3 | 147 | 6.8 | 3.4 |
| 4 | 139 | 7.2 | 3.6 |
| 5 | 132 | 7.6 | 3.8 |
| 6 | 125 | 8.0 | 4.0 |
| 7 | 119 | 8.4 | 4.2 |
| 8 | 114 | 8.8 | 4.4 |

Figure 2:
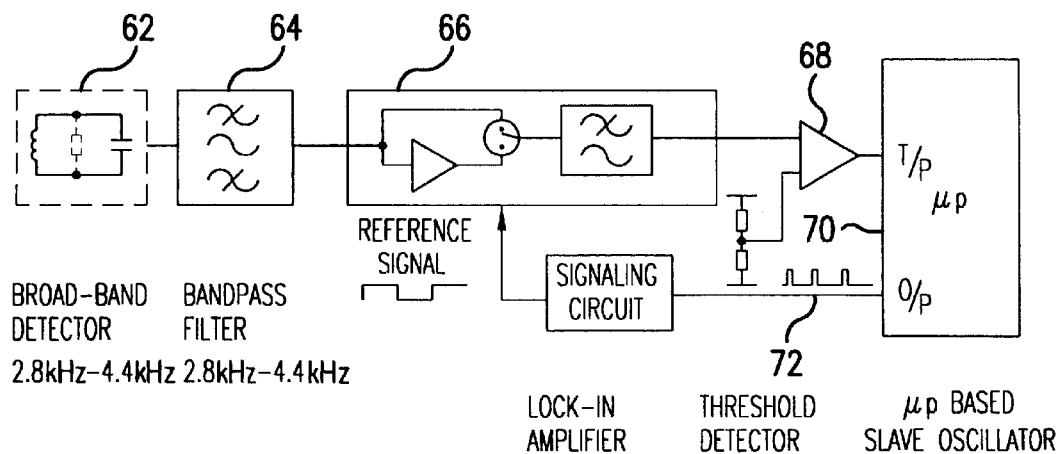
FIG. 2 is a general schematic circuit diagram of the split-frequency receiver according to the present invention.

Referring to FIG. 2, there is shown the split-frequency receiver. A broad-band detector 62 is arranged so as to provide an input to a band-pass filter 64. For example, the broad-band detector 62 can detect a frequency between 2.8–4.4 Khz. The output from the band-pass filter 64 is provided to a lock-in amplifier circuit 66. The output from the lock-in amplifier circuit is provided to a threshold detector 68 which then outputs a signal to the microprocessor based slave oscillator 70. The output 72 from the microprocessor based slave oscillator is steered to the same (reference) frequency for coherent detection.

The present invention therefore operates to overcome the disadvantages of interchannel-interference and cross-talk that would otherwise effect the operation between the transmitter and receiver, such as with respect to a heart rate chest belt transmitter which communicates wirelessly with a wrist-watch receiver or the like. Of course, the system can automatically select a different channel based on the signal quality.

Figure 3A:
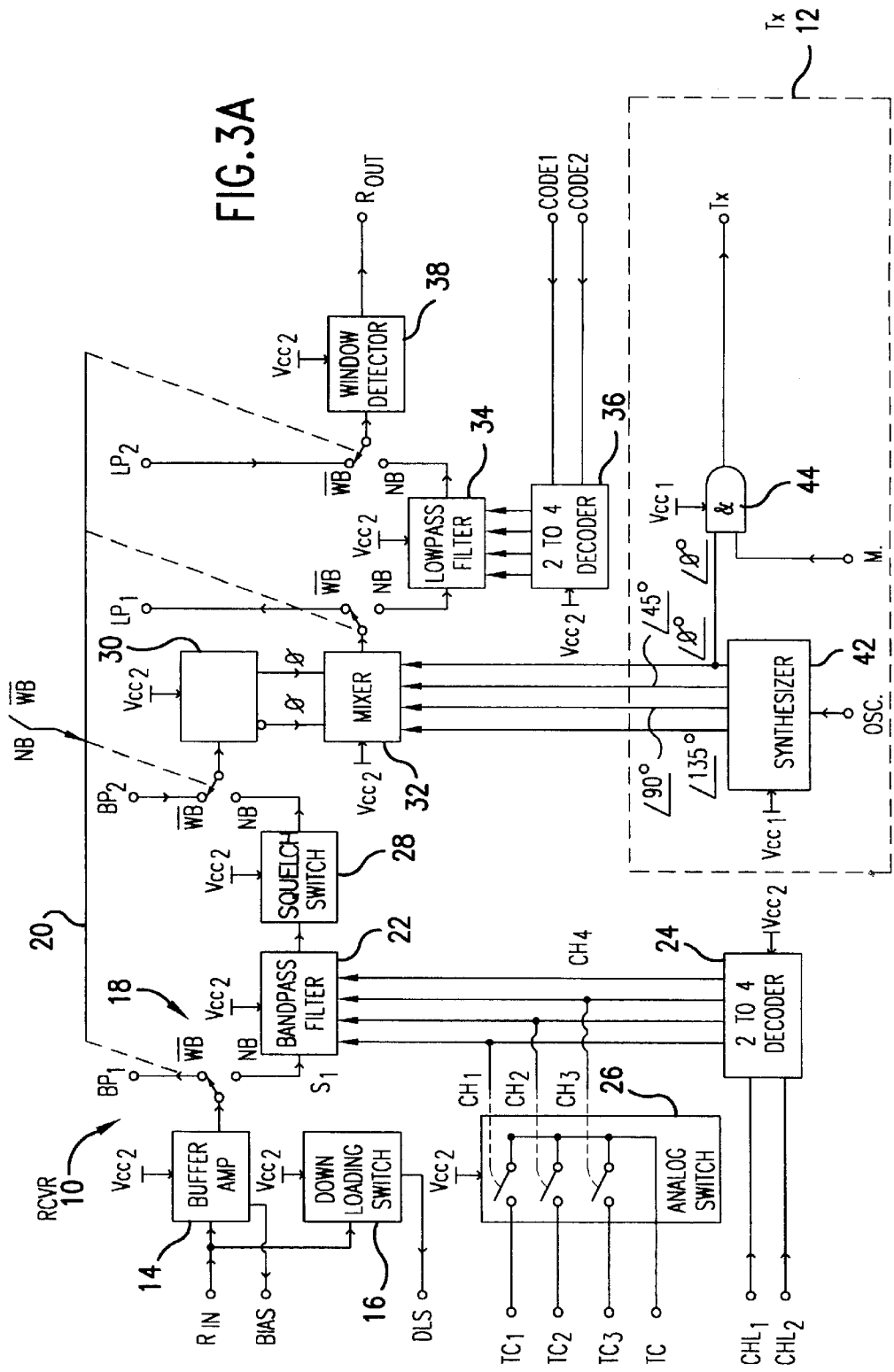
FIG. 3 is a detailed schematic block diagram of the multi-channel system according to the present intention.
Figure 3B:
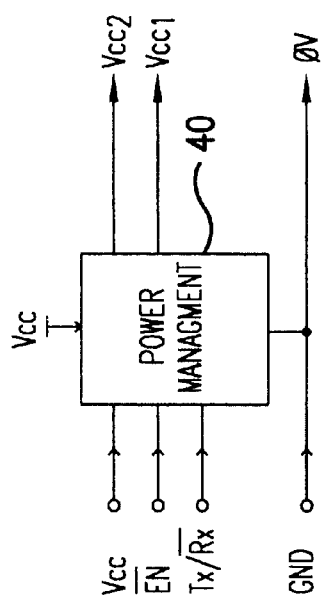

Referring to FIG. 3, a multi-channel transmitter/receiver system according to the invention is shown in a more detailed schematic block diagram form. The receiver 10 receives the receiver signal input $R_{in}$ into a buffer amplifier 14 which can, for example, be an adjustable gain amplifier. The gain setting of the amplifier can be externally performed. The input signal is also provided to a downloading switch circuit 16 which provides a down load switch signal DLS to the microprocessor for initialization.

After amplification, the signal passes through a switch 18 configured to select either a wide band $\overline{WB}$ or a narrow band NB operation. For wide band operation, a bypass 20 is provided to route the signal around the filters used, as discussed below, for narrow band signals. For narrow band operation, such as with a heart rate monitor or the like using 4 channels, the signal S1 is input to a bandpass filter 22 which selects the signal frequency. The bandpass filter 22 is adjustable via the 2-to-4 decoder 24 which selects the center channel frequency for the bandpass filter 22. The selection can be software controlled. The decoder 24 receives two inputs CHL1, CHL2 in order to select one of four center frequencies as noted, by way of example, in the table below.

| BANDPASS TABLE | | | |
|---|---|---|---|
| CHL1 | CHL2 | Center Frequency | Q |
| 0 | 0 | 4680 Hz | 40 |
| 0 | 1 | 5460 Hz | 40 |
| 1 | 0 | 6554 Hz | 40 |
| 1 | 1 | 7292 Hz | 40 |

Typically, the bandpass filter 22, as well as various other components of the transmitter/receiver, are implemented using an ASIC chip. Large capacitances, however, are necessary to adjust the low frequency bandpass filter, which capacitances are difficult to implement in an ASIC. Therefore, an additional analog switch 26 is provided to selectively couple (switch) in parallel the necessary large external capacitances TC1, TC2, TC3, TC. Thus, the decoder 24 also selectively operates the analog switch 26 in order to couple in parallel the appropriate capacitance for tuning the bandpass filter 22 to the selected frequency.

The selected frequency output from the bandpass filter 22 is then provided to a squelch circuit 28. The squelch circuit 28 substantially increases the signal to noise ratio (SNR) of the selected signal. For example, use of the multi-channel system with a heart rate monitor over a narrow bandwidth normally is affected by motor noise, such as occurs from the operation of a treadmill or other exercise apparatus. This motor noise can be eliminated through the use of the squelch circuit 28. The squelch circuit can optionally be manually adjustable. The output from the squelch circuit 28 is provided to a local oscillator of a quadrature detector formed of an inverting amplifier 30 which provides phased signals (in-phase, out of phase) θ, $\overline{\theta}$ to a mixer circuit 32 for coherent detection.

The multi-channel system performs 4-phase coherent detection (quadrature detector). A four phase signal from a synthesizer 42 is provided to the mixer 32. The output from the mixer 32 is then passed through a lowpass filter 34 having an adjustable cut-off frequency based on code inputs (CODE 1, CODE 2) provided to a 2-to-4 decoder 36. The cut-off frequencies for use with a heart rate monitor can, for example, be those shown in the table below.

LOWPASS TABLE

| CODE 1 | CODE 2 | Cut-Off Frequency |
|--------|--------|-------------------|
| 0 | 0 | 10 Hz |
| 0 | 1 | 30 Hz |
| 1 | 0 | 100 Hz |
| 1 | 1 | 150 Hz |

The lowpass filter output is then provided to a window (threshold) detector 38 which provides the receiver output $R_{out}$ to the microprocessor control.

As shown in FIG. 3, the transmitter portion 12 of the schematic block diagram includes the synthesizer 42 which receives an oscillator input. One of the outputs from the synthesizer 42 is provided to an AND gate 44 which provides the output transmission.

A power management circuit 40 is also arranged to provide power to both the transmitter $V_{cc1}$, and the receiver $V_{cc2}$ in accordance with the operating mode of the circuit based on the following table, for example.

POWER CONTROL TABLE

| EN | $T_x/R_x$ | $V_{cc1}$ | $V_{cc2}$ |
|----|-----------|-----------|-----------|
| 0 | 0 | On | On |
| 0 | 1 | On | Off |
| 1 | 0 | Off | Off |
| 1 | 1 | Off | Off |

Accordingly, the present invention provides a multi-channel system using coherent detection which provides high selectivity on the order of a typical channel separation of a few hundred Hz. The system is useful for data transmissions over inductive, infrared, sonic and cable links. The circuit provides superior electrical noise immunity due, in particular, to the use of the squelch circuit 28 for the narrow bandwidth application.

Figures 1, 4A:
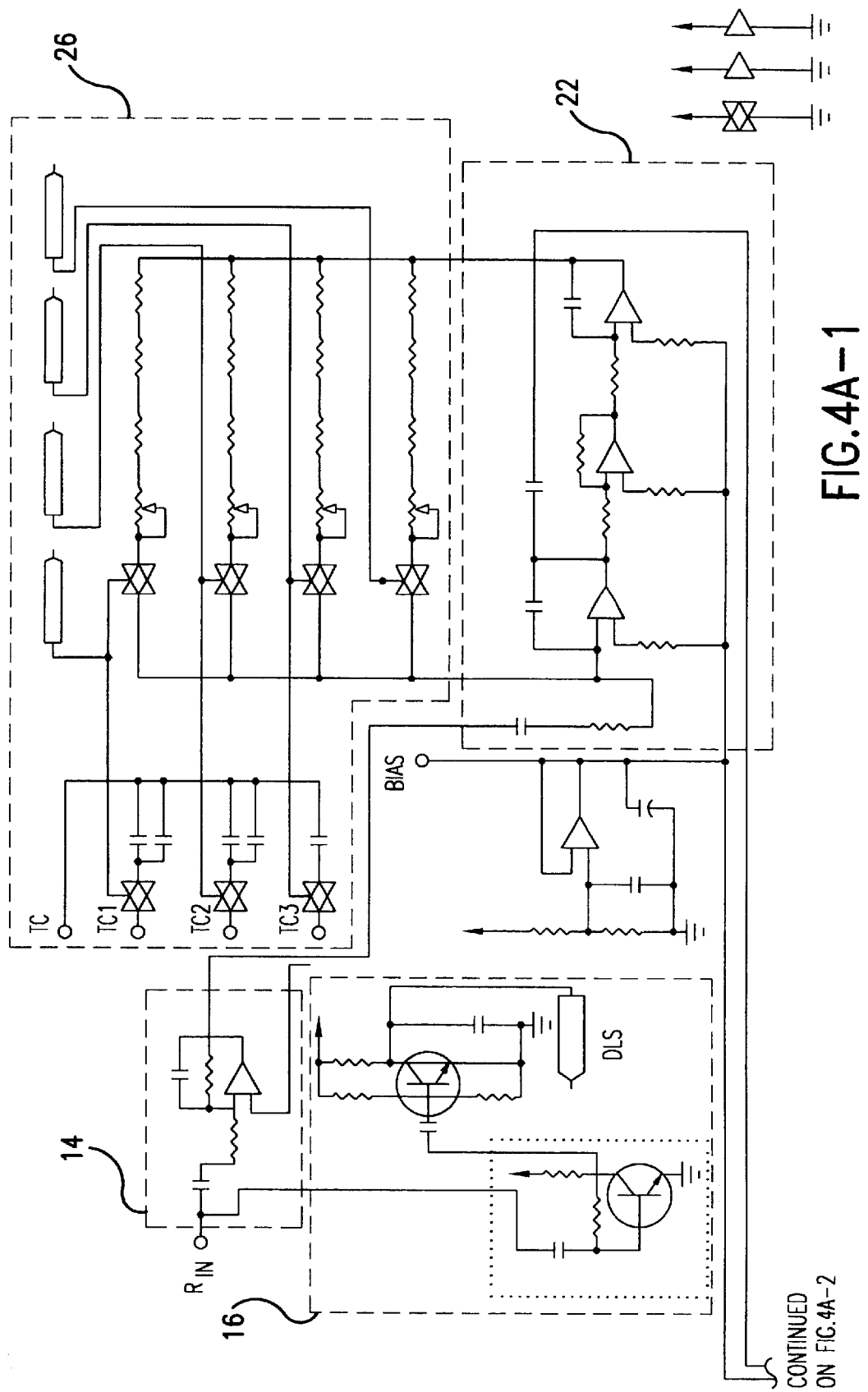
FIGS. 4a and 4b are schematic circuit diagrams of a preferred embodiment of the multi-channel system generally as described in FIG. 3 according to the present invention.
Figures 2, 4A:
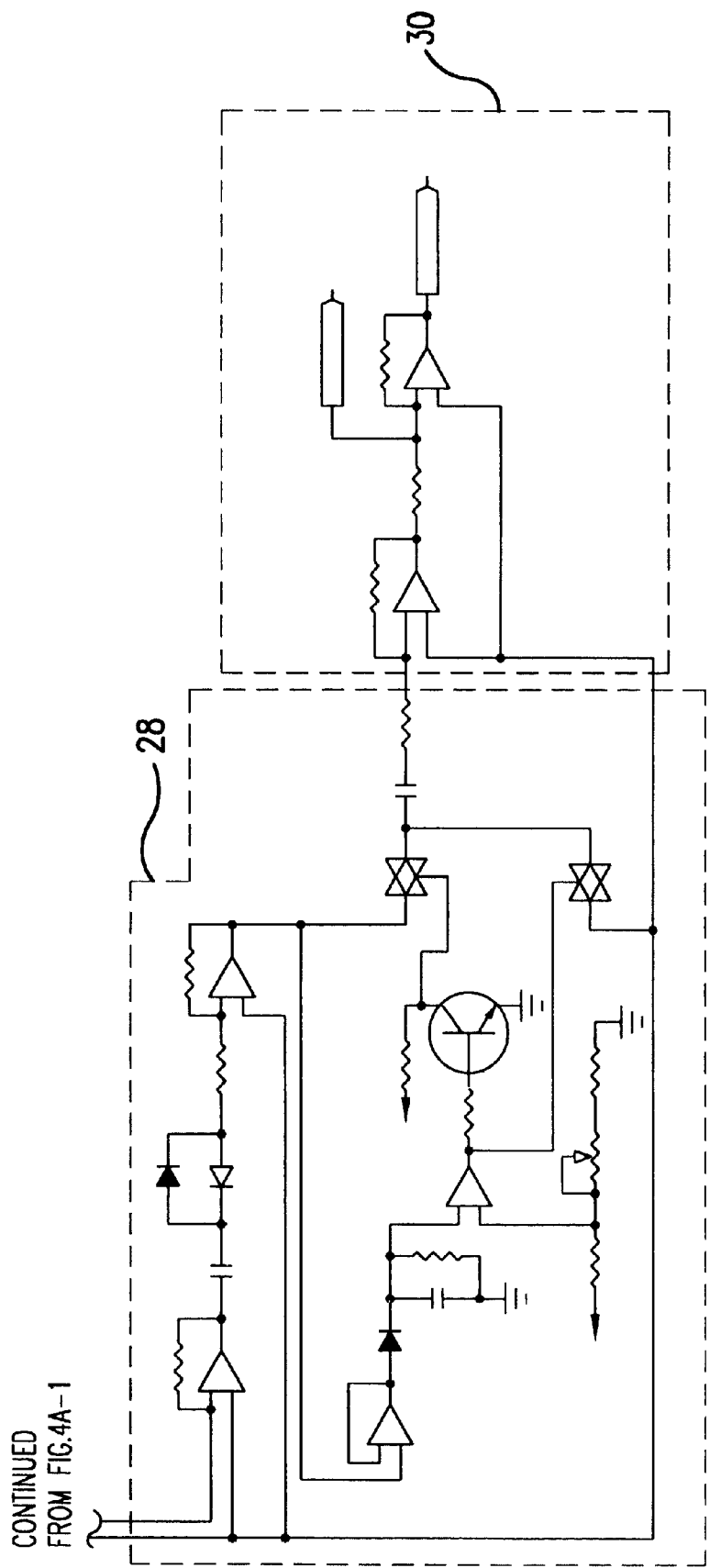
Figures 1, 4B:
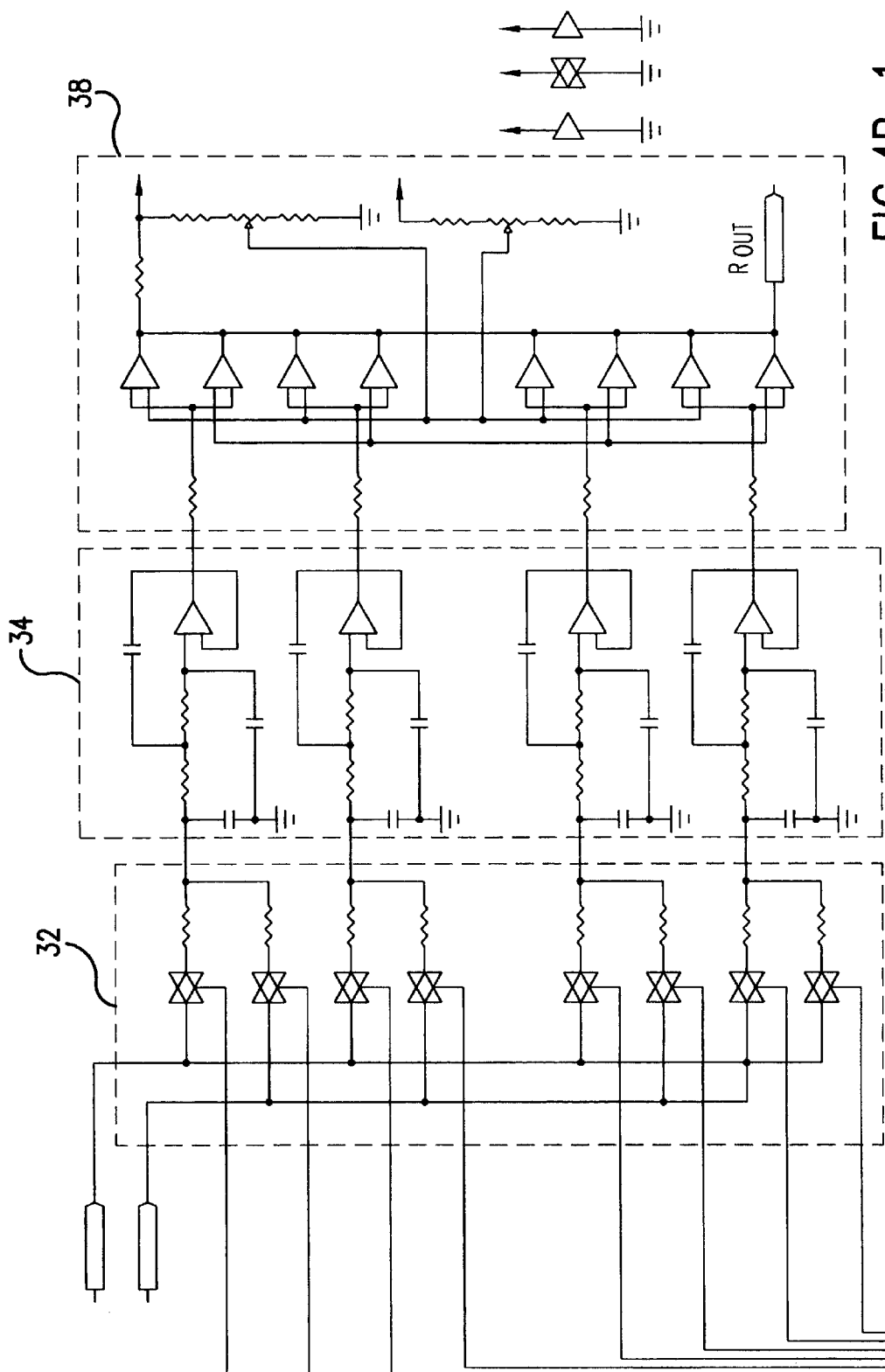
Figures 2, 4B:
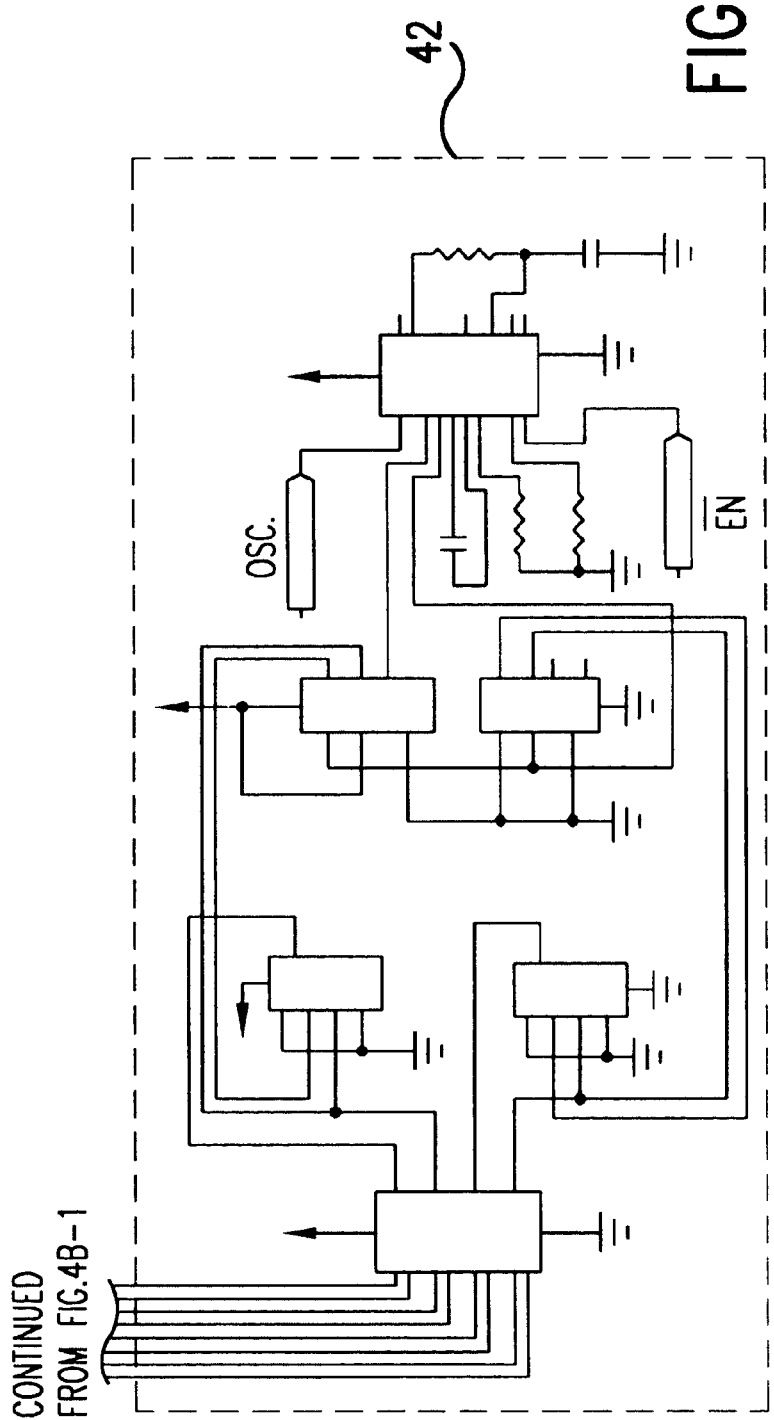

FIGS. 4*a* and 4*b* illustrate a preferred prototypical embodiment of an ASIC implemented system generally according to the block diagram of FIG. 3. In FIGS. 4*a* and 4*b*, corresponding components are indicated via the dashed-line boxes as best possible.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A digital telemetry system, comprising:
   a low frequency transmitter including an oscillator controlled synthesizer which is a software direct synthesis providing a 4-phase output based on a predetermined fixed frequency look up table; and
   a low frequency, narrow bandwidth, receiver, said receiver comprising:
      a buffer amplifier which receives an input signal and provides an amplified output signal;
      a bandpass filter which receives the output signal from the buffer amplifier and provides a filtered frequency signal, said bandpass filter being adjustable for selection of a center channel frequency based on programmed operation of a decoder;
      a squelch switch which receives the filtered frequency signal from the bandpass filter and provides an output signal having a high signal to noise ratio;
      a mixer circuit which receives inverted and non-inverted signals from the squelch switch, as well as 4-phase output signals from a synthesizer in order to perform coherent detection with an increased sensitivity and to provide an output signal which is the rectification of base band data;
      an adjustable lowpass filter which receives the output signal from the mixer and provides a filtered output signal; and
      a window detector circuit which receives the filtered output signal and provides a receiver output signal.

2. A digital telemetry system according to claim 1, wherein the bandpass filter is a portion of an ASIC, and further comprises external capacitances which are adjustably coupled in parallel to select the center frequency of the bandpass filter in accordance with the decoder output.

3. The digital telemetry system according to claim 1, wherein the system provides data transmission over one of an inductive, infrared, sonic and cable link.

\* \* \* \* \*